United States Patent [19]

Giezen et al.

[11] 4,154,107

[45] May 15, 1979

[54] TIME TEMPERATURE INDICATING DEVICE

[75] Inventors: Egenius A. Giezen, Rheden; Cornelis A. M. Hoefs, Elst; Abram Opschoor, Dieren; Eduard M. Verhulst, Zevenaar, all of Netherlands

[73] Assignee: Akzona Incorporated, Asheville, N.C.

[21] Appl. No.: 884,321

[22] Filed: Mar. 7, 1978

[30] Foreign Application Priority Data

Mar. 15, 1977 [NL] Netherlands ............... 7702749

[51] Int. Cl.² ............................................ G01K 11/16
[52] U.S. Cl. ...................................................... 73/356
[58] Field of Search ........... 73/356; 116/114 V, 114.5

[56] References Cited

U.S. PATENT DOCUMENTS

| 3,243,303 | 3/1966 | Johnson | 73/356 |
| 3,922,917 | 12/1975 | Ayres | 73/356 |
| 4,057,029 | 11/1977 | Seiter | 116/114 X |

Primary Examiner—S. Clement Swisher
Attorney, Agent, or Firm—Francis W. Young; David M. Carter

[57] ABSTRACT

There is provided a time temperature device having an indicator layer which visually indicates the lapse of a time temperature integral. A signaling component is provided which, upon contact with the indicating layer, causes the indicator layer to undergo a visually perceptive change. The device further includes a reservoir for the signaling component, including a first backing and adhesive layer containing an adhesive substance. The adhesive layer is positioned between the indicating layer and the first backing.

34 Claims, 13 Drawing Figures

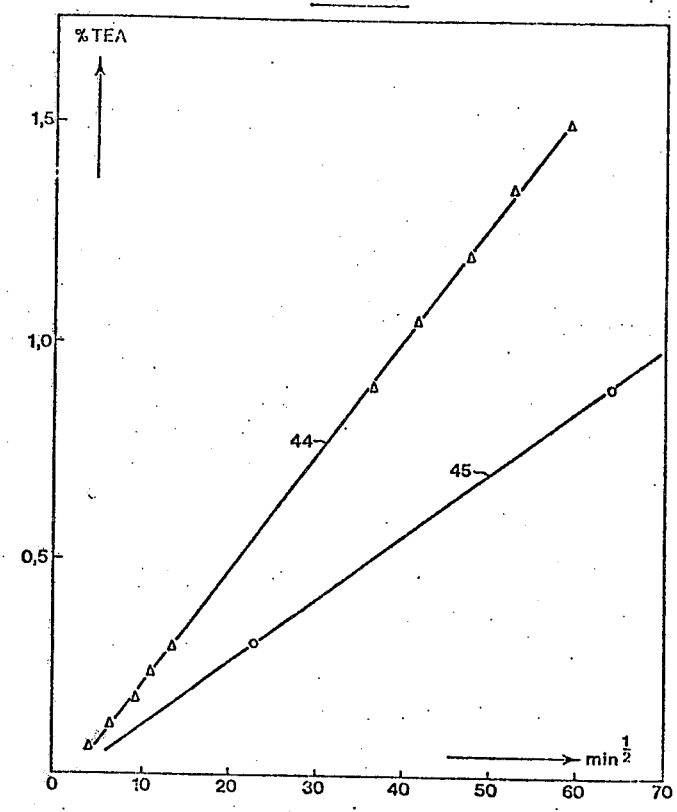

TIME TEMPERATURE INDICATING DEVICE

BACKGROUND OF THE INVENTION

This invention relates to a time temperature indicating device for visually indicating the passage of a certain time temperature integral.

With a large number of products which may deteriorate or perish during storage there is need for a simple, inexpensive and easily attachable time indicating device. Such a device should clearly indicate the lapse of a particular permissible period of time for storage or use.

For applications regarding products whose keeping quality decreases with increasing temperature, it is desirable that this factor be taken into account by the indicating device.

A known time temperature indicating device comprises a capsule containing an evaporating substance such as glacial acetic acid. The capsule is placed in a small plastic bag through the wall of which acetic acid vapour can slowly diffuse. Positioned near the bag is a wick which contains an acid-base indicator. The device is isolated from the ambient atmosphere in that is packaged with a material which is impermeable to gases. The indicator is activated by breaking the capsule. Acetic acid vapour will then slowly diffuse through the wall of the bag and penetrate into the end of the wick placed near the bag, which will cause a distinct color change in the acidbase indicator. With the passage of time more acetic acid is supplied and an increasingly large part of the wick will be discolored, which is still speeded up with increasing temperature. A graduated scale placed along the length of the wick indicates to what extent the product guarded by the indicating device is still keepable.

A disadvantage of such an indicating device is that it is rather susceptible to leakage of developed gas. Should the capsule break or leakage be caused in some other way, then the indicator will discolor too fast. Should the outer packaging material be damaged, then acetic acid vapour will escape and the indicator will respond too slowly or not at all.

OBJECTS OF THE INVENTION

It is one object of this invention to provide an improved time temperature indicating device. It is another object to provide an inexpensive, readily manufactured time temperature indicating device. It is still another object of this invention to provide an improved time temperature indicating device which is rugged and is not susceptible to leakage of its active components.

SUMMARY OF THE INVENTION

In accordance with one form of the present invention, there is provided a time temperature indicating device having an indicator layer which visually indicates the lapse of a time temperature integral. The device further includes a signaling component which upon contact with the indicator layer causes the indicator layer to undergo a visually perceptable change. A reservoir is provided for the signaling component. The reservoir contains a first backing and adhesive layer containing an adhesive substance. The adhesive layer is positioned between the indicator layer and the first backing.

In this indicating device the signaling is brought about in that the signaling component contained in the reservoir migrates to the indicator layer, where it effects a perceptible change. By signaling component, is also to be understood a substance from which a component is released which causes the actual color change in the indicator layer.

The first backing may, for instance, be plastics film containing the signaling component. The required proper contact between this backing and the indicator layer may be obtained by superficially softening the side of the film facing the indicator layer. The film itself then forms the adhesive layer with the aid of which the bonding to the indicator layer is effected.

Preference, however, is given to a construction characterized in that the adhesive layer contains a pressure-sensitive adhesive substance and the signaling component is dissolved in the pressure-sensitive adhesive substance.

The pressure-sensitive adhesive substance should not age too fast and the signaling component should be satisfactorily soluble in it.

A suitable adhesive substance is found to be a self-hardening pressure-sensitive glue having a basis of acryl, more particularly having a basis of polybutyl acrylate, dissolved in methyl ethyl ketone. A first embodiment of the indicating device according to the invention is characterized in that the indicator layer contains an acid-base indicator, and the component soluble in the adhesive substance is a reagent having an acidity which deviates from $pH=7$, which reagent effects a change of color of the acid-base indicator upon coming into contact with same. It is preferred that the reagent should be an acid, and more particularly maleic acid. In the case of prolonged color transformation (of the order of several months) it is recommended to select an acid from the group of paratoluene sulphonic acid, naphthalene sulphonic acid and camphor sulphonic acid.

A suitable construction of the indicating device according to the invention is characterized in that the indicator layer contains absorbent paper which includes the acid-base indicator and a wetting agent, and the wetting agent retains water in a sufficient amount to cause the reaction between the reagent and the indicator to take place. In order that the color change of the indicator paper may be as uniform as possible, it is recommended to choose a paper which is substantially free from hydrophobic substances.

It is preferred to choose an acid-base indicator whose color changes in a range below $pH=7$.

A very suitably acid-base indicator seems to be bromophenol blue. It is preferred that the wetting agent to be used should be hygroscopic. Excellently suitable wetting agents are found to be the ones containing salts which are capable of binding water of crystallization, namely $LiCl_2$ and $MgCl_2$.

Very favorable results are obtained with a wetting agent containing $MgCl_2.6H_2O$ and glycerol.

If the indicator is to be used at freezing temperatures, the wetting agent should also have anti-freezing properties. A further variant construction of the indicating device according to the invention is characterized in that the indicator layer contains a base. Trihydroxyethylamine has been found to be a particularly suitable base.

The adhesive layer on the first backing layer may be positioned in direct contact with the indicator layer or be separated from it by a diffusion film.

Another embodiment of the indicating device according to the invention is characterized in that there is provided a second backing coated with an adhesive layer containing a pressure sensitive adhesive substance facing the adhesive layer on the first backing, and the acid-base indicator is contained in the adhesive layer of the second backing. The color change range of th acid-base indicator is preferably below pH=7. As examples of suitable acid-base indicators may be mentioned methyl violet, cresol red, crystal violet, metanil yellow, tropeolin 00, benzyl orange, butter yellow (dimethyl yellow) and methyl red.

Particularly suitable is butter yellow.

Although the adhesive layer on the second backing layer may be positioned in direct contact with the first backing, the two adhesive layers may instead be separated by a diffusion film to retard the migration of the signaling component to the indicator layer.

Still another construction of the indicating device according to the invention is characterized in that the component soluble in the adhesive is iodine, and the indicator layer contains absorbent paper which includes starch and a wetting agent in which the iodine is soluble.

Instead of starch, another substance may be used which together with the suitable signaling component forms a complex effecting a color change.

The adhesive layer on the first backing may be positioned in direct contact with the indicator layer or be separated from the same by a diffusion film.

A further embodiment is characterized in that the component soluble in the adhesive substance applied to the first backing is a coloring agent and in that there is provided a second, transparent backing to which there is applied an adhesive layer containing a pressure-sensitive adhesive substance, which adhesive layer faces the adhesive layer on the first backing and is intransparent for the color of the coloring agent.

With this last mentioned construction, it is preferred that the adhesive layer applied to the second backing should contain a delustring agent such as titanium dioxide.

The two adhesive layers may be placed in direct contact with each other or maybe separated from each other by a diffusion film.

In order that the indicating device may be rapidly and easily attachable it is recommended that of at least one backing the two sides are provided with a pressure-sensitive adhesive substance.

BRIEF DESCRIPTION OF THE DRAWINGS

Subject matter which is regarded as the invention is set forth in the impending claims. The invention itself, however, together with further objects and advantages, will be better understood by reference to the following drawings.

FIG. 13 is a graphical representation showing the relationship between base concentration and the square root of color transformation time used in the device according to this construction shown in FIG. 1.

DESCRIPTION OF THE PREFERRED EMBODIMENTS

Figure 1:
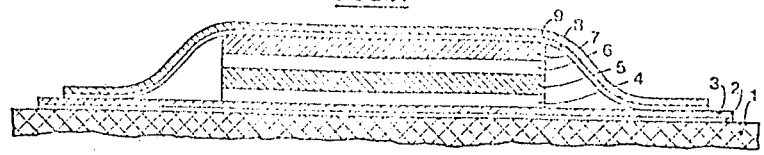
FIG. 1 shows a cross-sectional side view of a first embodiment of a time temperature indicating device in accordance with the invention.

FIG. 1 schematically shows part of a packaged product referred to by numeral 1. On the wrapping of the product 1 there is stuck a self-adherent label 3 provided to this end with a layer of glue 2.

On the label there is placed a time-temperature indicating device which serves to visually signal the lapse of the permissible keeping time of the product. The indicating device will also take into account the temperature of the product, i.e., in such a way that a higher keeping temperature will lead to earlier signaling.

The indicating device comprises a first backing 5 whose two sides are respectively provided with an adhesive layer 4 and 6, both consisting of a pressure-sensitive adhesive substance. The adhesive layer 4 serves to bond the backing 5 to the label 3. The adhesive layer 6 contains an acid dissolved therein.

The combination 4-5-6 is formed by an adhesive tape whose two sides are provided with a pressure-sensitive adhesive substance.

Figure 2:
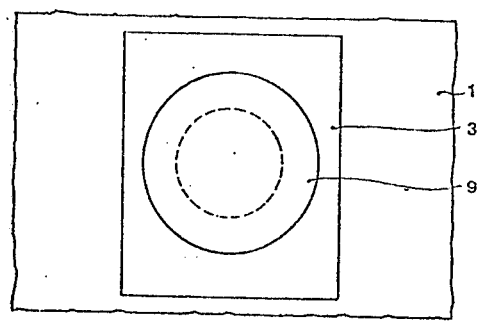
FIG. 2 is a plan view on a smaller scale of the embodiment according to FIG. 1.

Onto the adhesive layer 6 there is pressed an indicator layer 7 consisting of absorbent paper containing an acid-base indicator and a wetting agent. In its aqueous state the wetting agent forms both a solvent for the acid in the adhesive layer 6 and for the acid-base indicator in the indicator layer 7. The acid-base indicator is so choosen that under the influence of the acid in the adhesive layer 6 it will after some time display a distinct color change. On the indicating device 4-5-6-7 there is placed a transparent protective film 9 provided with an adhesive layer 8. The protective film, which may be formed by adhesive film coated on one side with a pressure-sensitive adhesive substance, seals the indicator all around in order to protect it from moisture and other influences. To this end the film has its peripheral edge stuck to the label 3. FIG. 2 is a plan view on a smaller scale of the construction illustrated in FIG. 1. After the indicator layer 7 has come into contact with the adhesive layer 6, acid will migrate from the adhesive layer 6 to the indicator layer 7. After some time the acid-base indicator, under the influence of the acid, has entirely changed color, which is visible through the protective film 9.

Figure 3:
FIG. 3 shows another embodiment of the device in accordance with the present invention.

FIG. 3 shows a construction in which use is made of a diffusion film 10 between the "active" adhesive layer 6 and the indicator layer 7. Depending on its composition and its thickness, the diffusion layer 10 causes a certain retardation of the color change in that the acid must first penetrate through this layer. This construction, which is further identical with the one according to FIG. 1, lends itself to be used in cases where a prolonged storage time is permissible.

The indicator layer 7 may be an independent layer which is combined with the other layers of the indicating device only by means of a protective film 9 provided with an adhesive layer 8. The indicator layer may be more securely attached, however, if it is formed integral with the diffusion layer 10. To this end use may be made of a diffusion film coated with a paper layer which is to serve then as indicator layer. It is also conceivable to make use of a diffusion film on which the indicator layer has been "printed".

Figure 4:
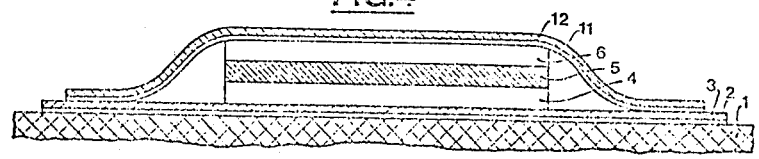
FIG. 4 shows still another embodiment of the device in accordance with the present invention.

FIG. 4 shows a different embodiment of the time-temperature indicating device according to the invention. Here the acid-base indicator is contained in the adhesive layer 11, which is applied to a second, transparent backing 12. The second backing 12 also serves as protective layer for the indicating device and serves the same purpose as the protective layer 9 in the construction according to FIG. 1.

Advantages of the construction of FIG. 4 over the constructions of the FIGS. 1 through 3 are that no paper layer or wetting agent is needed. Further, no uneven discoloration of the indicator layer will take place, which may occur when the indicator layer contains paper.

As the indicating device according to FIG. 4 changes color only gradually, it may be desirable to make use of a mark with a reference color in the case where an abrupt color change is required.

Another solution in which a reference color is required will be discussed with reference to FIG. 6.

Figure 5:
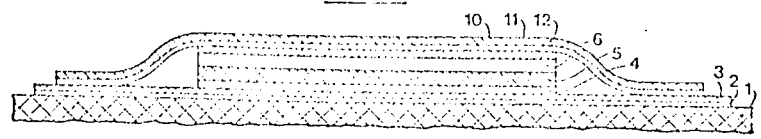
FIG. 5 shows another embodiment of the device in accordance with the invention.

The construction according to FIG. 5 differs from the one according to FIG. 4 in that in the former one use is made of a diffusion film 10 between the "active" adhesive layers 6 and 11. As in the construction according to FIG. 3, the diffusion layer 10 serves to retard the color change of the indicator.

Figure 6:
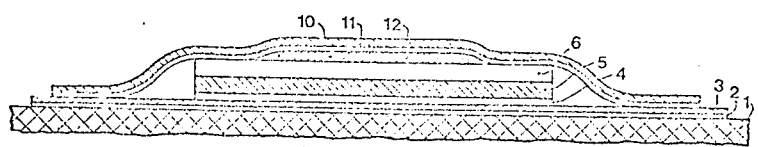
FIG. 6 shows still another embodiment of a device made in accordance with the invention.

FIG. 6 shows the same construction as illustrated in FIG. 5, except that the diffusion film 10 does not keep the "active" adhesive layers entirely separated from each other. Here the adhesive layer 11 is in direct contact with the edge of the adhesive layer 6, as a result of which the discoloration at the edge is completed before the discoloration of the diffusion layer. The color finally assumed by the edge of the "active" adhesive layer 6 then serves as a reference color for the observer to determine to what extent the color change of the diffusion film 10 has progressed.

Figure 7:
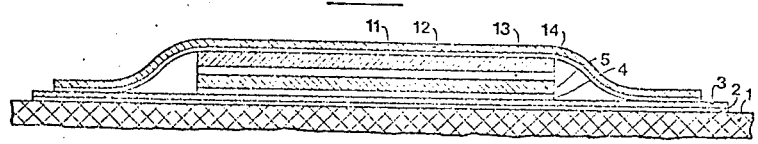
FIG. 7 shows still another embodiment of a device made in accordance with the invention.

The construction according to FIG. 7 is a variant of the ones according to FIGS. 1 through 3. Instead of an acid, iodine has now dissolved in the pressure-sensitive adhesive substance of the adhesive layer 13. The indicator layer 14 of absorbent paper contains starch and a wetting agent. When the wetting agent is in the aqueous state, it forms a solvent for the iodine. As soon as the "active" adhesive layer 13 is brought into contact with the indicator layer 14, iodine will migrate from the former layer to the indicator layer. Finally, the indicator layer 14 will be entirely blue.

Figure 8:
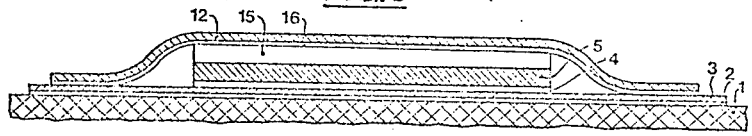
FIG. 8 shows yet another embodiment of a device made in accordance with this invention.

FIG. 8 shows a construction in which the adhesive layer 15 of the first backing contains a pressure-sensitive adhesive substance with a coloring agent dissolved in it. The pressure-sensitive adhesive substance of the adhesive layer 16 contains a delustring agent, such as titanium dioxide ($TiO_2$). The coloring agent, for instance methylene blue, diffuses in the adhesive layer 16 and causes the latter gradually to change color. Owing to the used delustring agent, however, the discoloration is not visible until the color front has penetrated into the adhesive layer 15, as far as near the underside of the transparent protective film 12.

Figure 9:
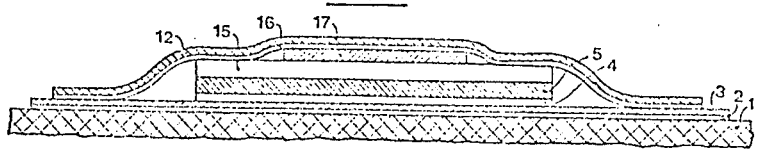
FIG. 9 shows still a further embodiment of a device made in accordance with this invention.

Retardation of the discoloration may be obtained by providing a diffusion film between the adhesive layers 15 and 16. FIG. 9 shows such a construction. In it the diffusion film 17 does not bring about complete separation between the adhesive layers 15 and 16, but it allows some contact between the two at the edge of the adhesive layer 15. Consequently, the discoloration is first visible at this edge and after that at the diffusion film. As in the construction according to FIG. 6, the final color of said edge serves as reference color.

Figure 10:
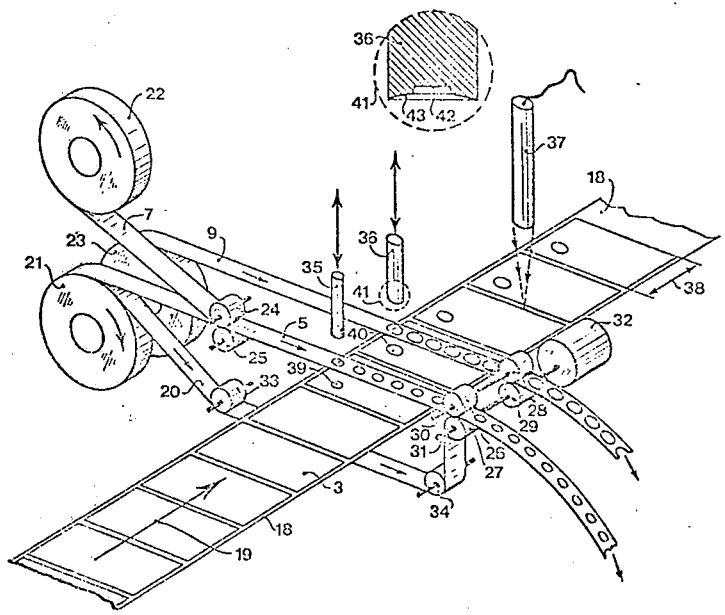
FIG. 10 shows an apparatus for manufacturing the indicating device according to the invention.

FIG. 10 indicates how the time-temperature indicating device can be made. It shows the manufacture of a construction according to the FIGS. 1 and 2. It will be clear, however, that the constructions of the other figures can be made in a similar way.

In the manufacture by means of the apparatus according to FIG. 10 the indicating devices are placed on labels, such as the ones referred to by the numeral 3, whose underside is provided with a pressure-sensitive adhesive substance, indicated in FIG. 1 by the reference numeral 4. The labels 3 are placed on a carrier 18 serving as release paper. The carrier with the labels is unwound from a roll (not shown) and transported in the direction indicated by the arrow 19.

The apparatus further has provisions for the supply of strips of material from which the various layers of the indicating device are made. A first strip of material is formed by an adhesive tape 5, which is on both sides provided with an adhesive layer containing a pressure-sensitive substance. The adhesive layer on the upper side of the tape 5 moreover contains an acid which is dissolved in the adhesive substance. The adhesive tape 5, together with a strip of release paper 20, which serves to protect the lower adhesive layer, is wound on a roll 21. A second strip of material is formed by a strip of absorbent paper 7 which is fed from a roll 22. The paper 7 contains an acid-base indicator and a wetting agent. A third strip of material comes from a roll 23 and consists of a transparent adhesive tape 9 whose underside is provided with an adhesive layer.

The transport of the strips of material is effected by three pairs of pressure rolls 24–25, 26–27, and 28–29. The rolls 26 and 28 are mounted on a common shaft 30 and the rolls 27 and 29 on a common shaft 31. The latter shaft is driven by an electric motor 32. Moreover, by-pass rolls 33 and 34 are provided to guide the strips of release paper 20.

Over the adhesive tapes 5 and 9 are punches 35 and 36, respectively, which can be made to move up and down by a driving mechanism (not shown). The punch 36 has a larger diameter than the punch 35 so that a larger disk may be punched out of the adhesive tape 9 than the disk which is punched out of the adhesive tape 5 by the punch 35.

A schematically indicated photocell detector 37 in cooperation with the device for transporting the carrier 18 causes the carrier to be moved stepwise over the pitch distance 38. The operation of the apparatus is as follows. After a fresh label 3 has come under the punch 35, the latter is moved downwards and punches a disk 39 out of the adhesive tape 5. The punch 35 subsequently presses the disk 39 onto the label 3, to which it will remain stuck as a result of the adhesive layer on the underside of the disk. Underneath the carrier 18, at the punches 35 and 36, there is a table (not shown in FIG. 10) which supports the carrier during the punching operation. Of the indicating device according to FIG. 1 the layers 4,5,6, and 7 are now formed.

The carrier 18 is then moved over one pitch distance in the direction indicated by the arrow 19. The punches 35 and 36 are so placed relative to each other that the disk 39 comes to a stop under the punch 36. The punch 36 subsequently punches a disk 40 out of the adhesive tape 9 and presses it onto the upper adhesive layer (6 in FIG. 1) of the disk 39. In this way the protective film 9 is stuck to the indicator layer 7 with the aid of the adhesive layer 8 (see also FIG. 1). As the disk 40 has a larger diameter than the underlying disk 39, the punch 36 will have its outer edge press the edge of the disk 40 on the label. With the adhesive layer 8 the disk 40 will stick to the upper side of the label 3, after which the indicating device will be sealed from its environment. As the punch 36 will simultaneously exert pressure on the middle and the edge of the protective film 9, it may be constructed as shown with the enlarged detail 41 in FIG. 10. As indicated in it, the punch 36 has in its bottom surface a recess 42 bounded by an outer edge 43. While the disk 40 is placed on the label, the recessed bottom 42 presses this disk onto the actual indicator and the outer edge 43 of the punch presses the edge of the disk onto the label. While the punch 36 punches a disk 40 out of the adhesive tape 9, the punch 35 now cuts a disk 39 out of the adhesive tape 5. To this end the adhesive tape 5 has since the preceding punching operation been transported a little further by the pressure rolls 26 and 27, which transport also takes place stepwise. Likewise, the adhesive tape 9 is advanced stepwise by the pressure rolls 28, 29.

After each transporting step the adhesive tapes 5, 9 stop sufficiently long to allow the punches 35, 36 to punch respectively a disk 39 and a disk 40 out of it. But if the punches operate at high speed, there is no need for the adhesive tapes to stop during each punching operation. After having passed the punches 35, 36, the punched adhesive tapes 5 and 9 are carried off by way of the pressure rolls 26, 27 and 28, 29, respectively. As is shown in FIG. 10, the protective paper 20 is separated from the adhesive tape 5 and passed under the carrier 18 by way of the by-pass rolls 33, 34, to be finally pressed onto the underside of the used part of the adhesive tape 5 by the pressure rolls 26, 27. It will then be discharged along with the adhesive tape 5.

After the punch 36 has done its work, the indicating device is ready for use. The label can now be pulled off from the carrier 18 and be stuck to a product of which the indicating device is to signal the permissible storage time. The label can, of course, be additionally used for mentioning all kinds of product data, such as sort, quantity, price, etc. Although the apparatus according to FIG. 10 is suitable to be used in a continuous process for the production of labels with indicating devices, immediately followed by the labels being stuck to the particular products, the apparatus also may be employed discontinuously. Further, the apparatus may be adapted to manual operation, in which the transport of the strips of material and/or the driving of the punches may be effected by manual effort.

In some cases, it may be necessary for the label to be manufactured and stuck to a wrapping at a moment prior to the moment from which the product is liable to deteriorate. Thus it is conceivable that the product is first stored for some indefinite period in a freezer, in which it will hardly deteriorate if at all. Or the label may have to be applied to the wrapping before the latter contains the actual product. In such cases, it should be taken care that the discoloration of the indicator does not set in prematurely.

To this end the wrapping may first be provided with such a part of the indicating device as contains the "active" adhesive layer and only at the beginning of the storage period in which the product is liable to deteriorate with an other part comprising the indicator layer.

Thus it is possible in the case of the construction according to FIG. 1 first to place a part of the indicating device consisting of the first backing 3 whose two sides are provided with the adhesive layers 2 and 4. The upper adhesive layer 4 may be covered with a layer of release paper. At the start of the actual storage time the release paper is removed from the layer and the remaining part of the device consisting of the indicator layer 7 and the protective film 9 with the adhesive layer 8 is placed on it. The other constructions may be formed accordingly.

The above-indicated first part of the indicating device may be attached to the wrapping by means of an apparatus as shown in FIG. 10. No indicator layer 7 will be supplied then; and instead of the transport adhesive tape 9 a strip of release paper will be used for the purpose of protecting the "active" adhesive layer 6 on the adhesive tape 5. In order that the release paper may be easily removed it is recommended to have it project sideways in such a way that one can easily and firmly get hold of it. The shape of the punch 36 being so adapted that at the release paper one or more tear ends are formed may also be of advantage in this respect.

EXAMPLES

To establish the influence of the various components of the indicating device a number of experiments were carried out with a construction which was composed as follows:

1. A first backing consisting of polyester film known under the trade name Melinex and having a thickness of 50 $\mu$m;

2. A 30 $\mu$m thick adhesive layer applied to the backing and consisting of a pressure-sensitive adhesive substance having an acid dissolved therein. For the adhesive substance there was used a self-hardening pressure-sensitive type of glue having a basis of acryl, known under the trade name Hycar 2100×26. This glue was dissolved in methyl ethyl ketone. To the glue solution there was added an acid also dissolved in methyl ethyl ketone. The concentration of the glue in the resulting solution was 20%. With the aid of a scraper this solution was spread on a polyester film placed on a glass plate. The film was subsequently dried to the air for about 15 hours and afterwards cured for 10 minutes at 120° C.

3. An indicator layer formed by absorbent paper of various grades and thicknesses. The paper was immersed in a dipping liquid composed of water, an acid-base indicator, a wetting agent and subsequently dried to air of 23° C., and a relative humidity of 50% over a period of 24 hours. Out of the resulting indicator paper, disks 6 mm in diameter were punched and subsequently stuck next to each other to a strip of transparent adhesive tape. Finally, the disks of indicator paper were stuck to the acidic adhesive layer, use being made of a roll in order to apply a constant pressure.

Use being made of various acids, acid concentrations, paper grades, wetting agents and acid-base indicators, the time required to obtain a complete color change was measured. The Examples I through IV were carried out at a constant temperature of 21° C. In Example V the indicating device was tested at various temperatures.

EXAMPLE I

Table I gives the color transformation times for the various acids used. The concentration of the acids calculated on the weight of the adhesive layer in the cured states was always 10%.

The acid-base indicator used was 0.1 gramme of thymol blue dissolved in 21.5 ml of 0.01 N NaOH and 238.5 ml of water. The color change range of this indicator is between a pH of 1.2 and 2.8. At pH<1.2 the color is red; at pH>2.8 it is yellow. In Table I the time required by the indicator to change from yellow to red is always given for two different wetting agents.

TABLE I

| | Wetting agent | |
|---|---|---|
| Acid | G 6 | G 8 |
| cyanoacetic acid | 4 hours | 6 hours |
| dichloroacetic acid | 4 hours | 4 hours |
| 2,5-dihydrobenzoic acid | >7 days | >7 days |
| maleic acid | 8 hours | 9 hours |
| oxalic acid | 1¾ hours | 7 hours |
| trichloroacetic acid | 1¾ hours | 7 hours |
| picrinic acid | 21 hours | 26 hours |
| para-toluene sulphonic acid | 24 hours | 24 hours |

EXAMPLE II

Table II gives the influence of the acid concentration when the adhesive layer contains p-toluene sulphonic acid. This table also shows the influence of various wetting agents. Indicator, adhesive substance and absorbent paper are of the same kind as used in Example I.

TABLE II

| | Dipping liquid | | Acid: p-toluene sulphonic acid | | | | |
|---|---|---|---|---|---|---|---|
| | glycerol | water | 7.5% | 8.5% | 9.5% | 10.5% | 15% |
| G1 | 10% | 90% | 22–42 hrs* | — | — | — | 5 hrs |
| G5 | 15 | 85 | — | 48–72 hrs* | 28 hrs | 48–72 hrs* | — |
| G6 | 20 | 80 | — | 28–44 hrs* | 24 hrs | 6–20 hrs* | — |
| G7 | 25 | 75 | — | 48–72 hrs* | 28 hrs | 6–20 hrs* | — |
| G2 | 40 | 60 | 22–42 hrs* | — | — | — | 4½hrs |

*The color transformation time was between the limits indicated. It could not be determined accurately because the color change took place in the absence of an observer.

As it appears from Table II, the color transformation time decreases with increasing acid concentration. However, when use is made of the dipping liquid G5 containing 15% glycerol as wetting agent and 85% water, the color transformation time increases with the acid concentration increasing from 9.5 to 10.5.

In order that an increase in acid concentration may result in a decrease of the color transformation time, it is necessary to use a sufficiently large amount of wetting agent. If G5 is employed as dipping liquid, the amount of wetting agent (glycerol) is too small with the acid concentration increasing from 9.5 to 10.5 to also result in a shortening of the color transformation time.

EXAMPLE III

Table III, like Table II, gives the influence of the acid concentration when use is made of dipping liquid which contains glycol as well as glycerol and water. The indicator, the adhesive substance and the absorbent paper are of the kind employed in Example I.

TABLE III

| | Dipping liquid | | | Acid: p-toluene sulphonic acid | | |
|---|---|---|---|---|---|---|
| | glycerol | glycol | water | 8.5% | 9.5% | 10.5% |
| G8 | 5% | 5% | 90% | >72 hrs | >72 hrs | >72 hrs |
| G9 | 7.5% | 7.5% | 85% | 28–44 hrs* | 24 hrs | 28–44 hrs* |
| G10 | 10% | 10% | 80% | 28–44 hrs* | 24 hrs | 6–20 hrs* |
| G11 | 12.5% | 12.5% | 75% | 48–72 hrs* | 28–44 hrs* | 20–24 hrs* |

*Here the color transformation time was between the limits indicated. It could not be determined accurately, because the color change took place in the absence of an observer.

EXAMPLE IV

The influence of the absorbent paper is given in Table IV for three different kinds of acid and four different kinds of wetting agents.

The paper grades 1 through 5 were manufactured without the use of water and were obtained from Edet Nederland B.V. This paper is isotropic, both in the plane of the paper and perpendicular to it. As binder for this paper styrene butadiene rubber was used. Its weight per m² is indicated below.

The paper grade 5 contains a higher amount of binder than the other grades.

| Paper grade | Weight per m² in grammes |
|---|---|
| 1 | 45 |
| 2 | 65 |
| 3 | 85 |
| 4 | 100 |
| 5 | 100 |

The paper grade 6 is a very dense paper without hydrophobic susbtances which absorbs little wetting agent and indicator. This paper had a thickness of 100 μm and a weight per m² of 78 grammes. The paper grade 7 is chromatography paper obtained from W & R Balston Ltd., and referred to as Brand Genuine Whatman.

The paper grade 8 consists of a layer of cellulose fiber applied to a plastics film. It is marketed by Machery Nagel & Co. under the trade name Brand Polygram cel 300 UV 254.

The layer applied to the film had a thickness of 50 μm. The paper grade 9 is a technical blotting paper supplied by Edet Nederland B.V.

This paper neither contains a binder nor other additives such as gluing agents, as a result of which the wet strength is low. The thickness of this paper was 540 μm and the weight 270 grammes per m².

The dipping liquids used contain the following wetting agents in the concentrations mentioned:
K 5.0: 5% of a cationic polyurethane
K 0.5: 0.5% of a cationic polyurethane
G 9: see Table 3
G 6: see Table 1

The indicator and the adhesive substance are of the kind mentioned in Example I.

TABLE IV

| Paper | Maleic acid Dipping liquid | | | | Trichloroacetic acid Dipping liquid | | | | p-toluene sulphonic acid Dipping liquid | | | |
|---|---|---|---|---|---|---|---|---|---|---|---|---|
| | K5.0 | K0.5[3] | G 9 | G 6 | K5.0 | K0.5 | G 9 | G 6 | K5.0 | K0.5 | G 9 | G 6 |
| 1 | 72 hrs | — | 12 1/4 hrs | 10 hrs — | no colour change | 60 hrs | 2 1/6 hrs | 1/2 hr | no colour change | | 25 7/12 hrs | 23 3/4 hrs |
| 2 | 72 | — | 12 1/4 | 6 1/12 | " | 60 | 2 1/6 | 2 | " | | 29 1/4 | 34 1/4 |
| 3 | 80 | — | 13 1/4 | 6 1/12 | " | 60 | 4 1/4 | 2 | " | | 30 1/4 | 25 3/4 |
| 4 | 72 | — | 10 | 10 | " | 60 | 4 1/4 | 2 1/4 | " | | 31 1/4 | 37 1/4 |
| 5 | 80 | — | 13 1/4 | 6 1/12 | " | 60 | 5 1/4 | 5 11/12 | " | | 36 1/4 | 25 3/4 |
| 6[1] | — | — | — | — | — | — | — | — | — | | — | — |
| 7 | 72 | 72 | 2 3/4 | 1 1/4 | 72 | 14 1/4 | 1 1/4 | 2 1/4 | no colour change | | 5 5/12 | 6 3/4 |
| 8[2] | — | — | 4 1/12 | — | no colour change | 2 2/3 | 1/2 | 1/2 | " | | — | — |
| 9 | — | — | 37 3/4 | 25 1/4 | " | no colour change | 12 1/2 | 12 1/4 | " | | weeks | weeks |

[1]no clearly perceptible color change; this paper was too dense, as a result of which it absorbed little indicator and too faint colors were obtained.
[2]color change too little contrasting; the paper is too thin so that it absorbed too little indicator.
[3]except for paper grade 7 the color change was not clearly perceptible as a result of poor color contrast.

EXAMPLE V

The temperature-dependence of the color transformation time was determined in a number of experiments with indicating devices according to FIG. 1.

Figure 11:
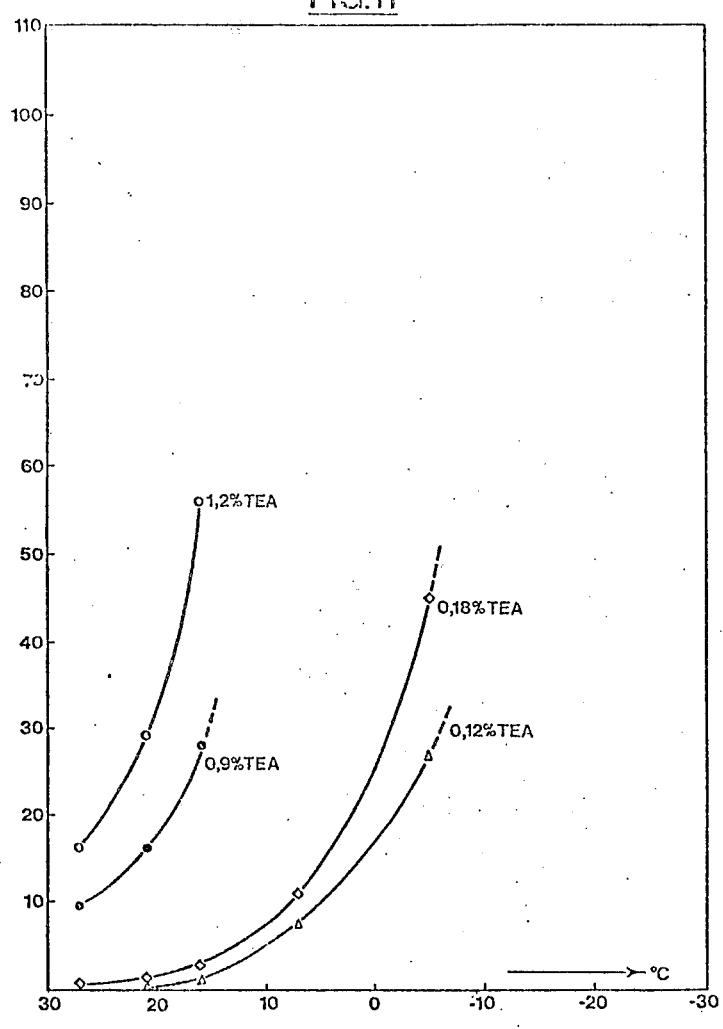
FIG. 11 is a graphical representation of the temperature dependence of the indicating device shown in FIG. 1 at various base concentrations.
Figure 12:
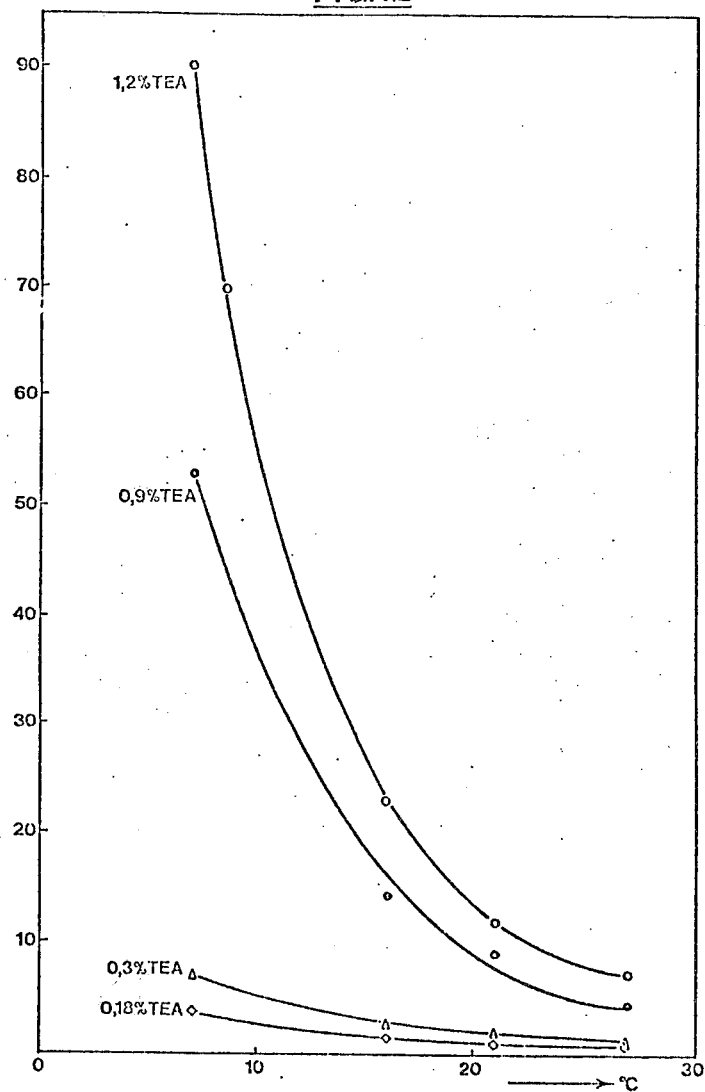
FIG. 12 is also a graphical representation showing the temperature dependence of the indicating device according to FIG. 1 at various base concentrations.

The experiments were carried out at $-27°$, $-12°$, $-5°$, $0°$, $7°$, $16°$, $21°$ and $27°$ C. The acid-base indicator used was bromophenol blue to which a base (TEA=-trihydroxyethylamine) had been added to prolong the color transformation time. The indicator paper used was chromatography paper marketed by W & R Balston Ltd. under the trade name Brand Genuine Whatman. Experiments were carried out with 3 different pressure-sensitive glues having a basis of acryl marketed by N.V. Chemische Industrie AKU-Goodrich under the trade names Hycar 2100×26 and Hycar 2100×146. These glues all contained 6% of dissolved maleic acid. The FIGS. 11 and 12 show the temperature-dependence of the indicating device according to FIG. 1 at various base concentrations. The temperatures are plotted on the abscissa and the color transformation times on the ordinate in hours. FIG. 11 shows the temperature-dependence when using the glue Hycar 2100×26, and FIG. 12 the temperature-dependence when using Hycar 2600×146.

The two graphs clearly show that the color transformation time decreases with increasing temperature and increases with increasing base concentration. It also follows that under otherwise equal conditions the use of Hycar 2100×26 gives a longer color transformation time than Hycar 2600×146.

EXAMPLE VI

To establish the influence on the color transformation time of the base added to the wetting agent the color transformation times were determined at various base concentrations.

The indicating devices tested were of the construction according to FIG. 1. The glue used was Hycar 2100×26, the acid-base indicator was bromophenol blue to which magnesium chloride, glycerol and TEA had been added. As indicator paper the chromatograph paper mentioned in Example V was used. The graphs in FIG. 13 show the relationship between the concentration of the base (trihydroxyethylamine) plotted on the ordinate and the square root of the color transformation time plotted on the abscissa in $\min^{\frac{1}{2}}$. The curve 44 holds for an indicating device of which the paper is immersed in a liquid containing 10% $MgCl_2$ and 2% glycerol. The curve 45 is for an indicating device of which the paper is immersed in a liquid containing 3% $MgCl_2$ and 2% glycerol.

The experiments were carried out at a constant temperature of 21° C.

COMPONENTS

As regards the components to be used the following may generally be stated.

When the adhesive layer contains an acid, the latter must have a sufficiently low $pK_a$ to effect a color change of the indicator. Moreover, the acid must be soluble in the adhesive substance. Oxalic acid and benzoic acid do satisfy the former requirement, but they are poorly soluble in the above-mentioned adhesive substance Hycar 2100×26.

These acids are separated again from this adhesive substance, so that the latter will lose part of its adhesive power. More satisfactory in this respect are para-toluene sulphonic acid and maleic acid, provided that the concentration thereof in the adhesive substance will not become so high that a too low solubility is obtained. The concentration had best be kept below 10%.

The adhesive substance should preferably be a pressure-sensitive glue which neither ages too fast nor discolors. The solubility of the acid is partly dependent on the molecular weight of the glue. At a relatively high molecular weight of the adhesive substance the acid will generally not be satisfactorily soluble in it. The same applies when in the adhesive substance a component other than an acid is to be incorporated, such as iodine or some coloring agent.

A suitable glue is the above-mentioned Hycar 2100×26 dissolved in methyl ethyl ketone having a solids content of 50%. The average Brookfield viscosity is 1200 cps at 25° C. The hardening time is 10 minutes at 145° C. In the presence of 0.25% phosphoric acid or 0.05% para-toluene sulphonic acid as catalyst the hardening time was 3 minutes at 114° C.

When use was made of a similar glue having a basis of acryl, marketed by N. V. Chemische Industrie AKU-Goodrich under the trade name Hycar 2100×33, it was found that several acids were not or insufficiently soluble in it. This was established to be the case for instance with p-toluene sulphonic acid, benzoic acid, camphor sulphonic acid, naphthalene sulphonic acid, 2,4,6-trihydroxybenzoic acid and 2,4-pyridine dicarboxylic acid. As solvent for this glue may serve a mixture of 80% cyclohexane and 20% methyl ethyl ketone. The solids content of this glue is 45%. The average Brookfield viscosity is 10,000 cps at 25° C. The hardening time is 15 minutes at 140° C. In the presence of 0.03% phosphoric acid as catalyst the hardening time was 3 minutes at 120° C.

Under some circumstances the glass transition temperature $T_g$ of the glue with the acid dissolved in it may be too high. For example, of Hycar 2100×26 with 6% maleic acid dissolved in it the $T_g$ is in the range −39° to +6° C. It may be desirable then to use a glue having a lower $T_g$. Or the $T_g$ may be reduced by mixing Hycar 2100×26 with polybutyl acrylate or with Hycar 2100×33. In the latter case it is recommended that the ratio Hycar 2100×26 to the higher molecular component to be mixed with it should not be chosen lower than 4:1, because otherwise the solubility of the acid in the glue may be a problem.

Both Hycar 2100×26 and Hycar 2100×33 do not age very fast. Nor do they discolor. They may also be applied to an underlying layer other than of polyester, for instance on an underlying layer of polyvinyl chloride.

For the underlying layer any suitable material may be chosen provided that it is resistant to the components in the adhesive layer applied to it. The underlying layer may form a barrier which prevents possibly toxic components of the indicating device from coming into contact with the product to be guarded. To this end use may be made of an additional protective film.

The choice of the acid-base indicator is not only determined by the desired signaling color, but also by, int.al., the desired indicator range. To avoid the disturbing influence of carbon dioxide contained in the air the indicator range should preferably be below pH=5.

Acid-base indicators having a pH range below 1.8 are not found to give a change of color in the above-discussed constructions. It is therefore advisable that for those constructions an acid-base indicator should be chosen whose indicator range is above a pH of 2.

It is further recommended to choose an acid-base indicator which is soluble in the wetting agent. Some acid-base indicators are found to be unsatisfactory because they are not soluble in the wetting agent used.

Acid-base indicators suitable in themselves are for instance those that are listed in Table 5.

The choice of them is dependent on color contrast, pH range, solubility in the wetting agent used and toxicity.

Table 5

| | Indicator | pH range | Acid-alkali colour | Concentration/solvent |
|---|---|---|---|---|
| 1. | methyl violet | 0.1–1.5 | yellow-blue | 0.01% in water |
| | | 1.5–3.2 | blue-violet | |
| 2. | brilliant green | 0.1–2.8 | yellow-green | — |
| 3. | cresol red | 0.2–1.8 | red-yellow | 0.1 g in 26.2 ml 0.01 N NaOH + 223.8 ml water |
| 4. | malachite green | 0.2–1.8 | yellow-blue/green | 0.1% in water |
| 5. | methyl green | 0.2–1.8 | yellow-green | 0.1% in water |
| 6. | erythrosin | 0.6–2.2 | red-orange | 0.1% in water |
| 7. | crystal violet | 0.8–1.8 | yellow-blue | 0.02% in water |
| 8. | quinaldine red | 1.0–2.2 | colourless-red | 1% in EtOH |
| 9. | metanil yellow | 1.2–2.3 | red-yellow | 0.01% in water |
| 10 | thymol blue | 1.2–2.8 | red-yellow | 0.1 g in 21.5 ml 0.01 N NaOH + 229.5 ml water |
| 11. | benzopurpurin | 1.3–5.0 | blue-orange | 0.1% in water |
| 12. | tropeolin oo | 1.4–2.8 | red-yellow | 0.01% in water |
| 13. | benzyl orange | 1.9–3.3 | red-yellow | — |
| 14. | 2,6-dinitro phenol | 2.4–4.0 | colourless-yellow | 0.1% in water |
| 15. | 2,4-dinitro-phenol | 2.8–4.0 | colourless-yellow | saturated solution in water |
| 16. | butter yellow (dimethyl yellow) | 2.9–4.0 | red-yellow | o.1% in EtOH |
| 17. | 4,4'-bis (2-amino-1-naphthylazo) stilbene disulphonic acid | 3.0–4.0 | purple-red | 0.1 g in 29.5 ml 0.01 N NaOH with 70.5 ml water |
| 18. | bromophenol-blue | 3.0–4.6 | yellow-blue | 0.1 g in 14.9 ml 0.01 N NaOH + 235.1 ml water |
| 19. | congo red | 3.0–5.0 | blue-red | 0.1% in water |
| 20. | methyl orange | 3.1–4.4 | red-orange/yellow | 0.01% in water |
| 21. | 4(4-dimethyl-amino-1-naphthylazo) 3-methoxybenzene sulphonic acid | 3.5–4.8 | violet-yellow | 0.1% in EtOH/water 6:4 |
| 22. | bromocresol green | 4.0–5.4 | yellow-blue | 0.1 g in 14.3 ml 0.01 N NaOH + 235.7 ml water |
| 23. | methyl red | 4.8–6.0 | red-yellow | 0.02% in EtOH/water 6:4 |
| 24. | bromocresol purple | 5.2–6.8 | yellow-purple | 0.1 g in 18.5 ml 0.01 N NaOH + 231.5 ml |

Table 5-continued

| Indicator | pH range | Acid-alkali colour | Concentration/solvent |
|---|---|---|---|
| | | | water |

As a rule, the color transformation time increases with increasing concentration and decreasing pH range of the indicator. The brightness of the color is influenced by the acid used.

The wetting agent is needed for the indicator to absorb the component from the adhesive layer which is to bring about the change of color. This component, and preferably also the indicator, should be soluble in the wetting agent. It seems preferable that the wetting agent to be used should be hygroscopic. In the case where the time temperature indicating device is used in an environment whose temperature is below freezing point, the wetting agent should also be an antifreeze.

As wetting agent may for instance be employed a mixture of glycol and glycerol. Glycol alone is not a suitable wetting agent because it is not sufficiently hygroscopic. Glycerol on the other hand is a suitable wetting agent, but when used in a relatively high concentration it leads to a poor adhesion between the paper and the layer of glue. As a result of the use of a wetting agent merely consisting of glycerol there would be a poor contact with the indicator layer. By mixing glycol and glycerol in a suitable ratio these drawbacks may be met. Such a mixture, however, has the disadvantage that in order that a uniform discoloration of the indicator paper may be obtained, it must be used in such high concentrations as might cause the wetting agent to be forced out.

The most favorable results are obtained with wetting agents composed of crystalline salts mixed with glycerol. Suitable crystalline salts are particularly $MgCl_2$ and $LiCl_2$, because they also lend themselves to be used in cases where a base is added to prolong the color transformation time. Some others are not satisfactory for instance because in the presence of a base they form a precipitate or give an insoluble carbonate or bicarbonate. An excellently suitable wetting agent is obtained by adding 10 grammes of $MgCl_2.6H_2O$ and 2 grammes of glycerol to 100 ml of water. To prevent precipitation of magnesium hydroxide when use is made of a base, the pH of the wetting agent must not be higher than 10.

As a rule, the wetting agent should satisfy the demands made on them in connection with their use for the time temperature indicating device, such as for instance proper and even absorption in the indicator layer of the component effecting discoloration, not be rapidly evaporating, have anti-freeze properties, etc.

When the indicator layer is to contain absorbent paper, it should be as homogeneous as possible in order to obtain uniform discoloration. The paper should also be in proper contact with the "active" adhesive layer. In the case where use is made of aqueous impregnating liquids the paper should as much as possible be free from hydrophobic matter, its presence counteracting proper and even absorption of the component effecting discoloration. The density of the paper is also of importance. In the case of high density little wetting agent and indicator are absorbed. The thickness of the paper layer also plays a role. A very thin paper layer absorbs little indicator, as a result of which only faint colors are produced, unless the concentrations of the acid-base indicator and a wetting agent can be increased.

The best results were obtained with the use of chromatography paper. Also suitable were found to be paper and technical blotting paper manufactured by the dry route.

With a time temperature indicating device of the construction according to FIG. 1 the best results were obtained when it was composed as follows:

| | |
|---|---|
| acid-base indicator | bromophenol blue |
| dipping liquid | contains 3 to 10% $MgCl_2.6H_2O$ with 2% glycerol |
| base (to prolong the color transformation time) | trihydroxyethylamine |
| indicator paper | chromatography paper Brand Genuine Whatman |
| pressure-sensitive adhesive substance | Hycar 2100 × 26 or Hycar 2600 × 146 or Hycar 2600 × 222 |
| acid | maleic acid |

The color transformation time may be influenced by inter alia: sort and concentration of the discoloration component of the glue on the first backing; the type of paper and its thickness; sort of acid. The color transformation time may be prolonged by adding a base and by using a diffusion film.

Of the above mentioned three adhesive substances, the first, Hycar 2100×26, has already been further described. The two others: Hycar 2600×146 and Hycar 2600×222 are latices having a basis of acryl, both having a solids content of about 50%.

We claim:

1. A time-temperature indicating device for visually indicating the passage of a certain time-temperature interval, characterized in that it comprises
    (a) an indicator layer which visually indicates the lapse of a time-temperature interval;
    (b) a signaling component which upon contact with the indicator layer causes the latter to undergo a visually perceptible change; and
    (c) a reservoir for the signaling component, which reservoir comprises a first backing and an adhesive layer containing a pressure sensitive adhesive substance, which adhesive layer is positioned between the indicator layer and the first backing; said signaling component is dissolved in the pressure sensitive adhesive substance.

2. A time-temperature indicating device according to claim 1 characterized in that the adhesive substance is a self-hardening pressure-sensitive adhesive substance having a basis of acryl, dissolved in methyl ethyl ketone.

3. A time-temperature indicating device according to claim 2, characterized in that the pressure-sensitive adhesive substance has a basis of polybutyl acrylate.

4. A time-temperature indicating device according to claim 1, characterized in that the indicator layer contains an acid-base indicator, and the component soluble in the adhesive substance is a reagent having an acidity which deviates from pH=7, which reagent brings about a change of color of the acid-base indicator upon coming into contact with same.

5. A time-temperature indicating device according to claim 4, characterized in that the reagent is an acid.

6. A time-temperature indicating device according to claim 4, characterized in that the acid is maleic acid.

7. A time-temperature indicating device according to claim 4, characterized in that the acid is selected from the group consisting of para-toluene sulphonic acid, naphthalene sulphonic acid and camphor sulphonic acid.

8. A time temperature indicating device according to claim 4, characterized in that the indicator layer contains absorbent paper which includes the acid-base indicator and a wetting agent, and the wetting agent retains water in a sufficient amount to cause the reaction between the reagent and the indicator to take place.

9. A time-temperature indicating device according to claim 8, characterized in that the paper is substantially free from hydrophobic substances.

10. A time-temperature indicating device according to claim 8, characterized in that the color change range of the acid-base indicator is below $ph=7$.

11. A time-temperature indicating device according to claim 10, characterized in that the acid-base indicator is bromophenol blue.

12. A time-temperature indicating device according to claim 8, characterized in that the wetting agent is hygroscopic.

13. A time-temperature indicating device according to claim 8, characterized in that the wetting agent contains salts capable of binding water of crystallization.

14. A time-temperature indicating device according to claim 13, characterized in that the salts are from the group consisting of lithium chloride and magnesium chloride.

15. A time-temperature indicating device according to claim 14, characterized in that the wetting agent contains $MgCl_2 \cdot 6H_2O$ and glycerol.

16. A time-temperature indicating device according to claim 8, characterized in that the wetting agent is an anti-freeze, whereby said device may be used at freezing temperatures.

17. A time-temperature indicating device according to claim 8, characterized in that the indicator layer contains a base.

18. A time-temperature indicating device according to claim 17, characterized in that the base is trihydroxyethylamine.

19. A time-temperature indicating device according to claim 1, characterized in that the adhesive layer on the first backing is placed in direct contact with the indicator layer.

20. A time-temperature indicating device according to claim 1, characterized in that between the adhesive layer on the first backing and the indicator layer there is a diffusion film.

21. A time-temperature indicating device according to claim 4, characterized in that there is provided a second backing to which there is applied an adhesive layer containing a pressure-sensitive adhesive substance, which adhesive layer faces the adhesive layer on the first backing and the acid-base indicator is contained in the adhesive layer of the second backing.

22. A time-temperature indicating device according to claim 21, characterized in that the color change range of the acid-base indicator is below $pH=7$.

23. A time-temperature indicating device according to claim 22, characterized in that the acid-base indicator is selected from the group consisting of methyl violet, cresol red, crystal violet, metanil yellow, tropeolin oo, benzyl orange, butter yellow (dimethyl yellow) and methyl red.

24. A time-temperature indicating device according to claim 23, characterized in that the acid-base indicator is butter yellow.

25. A time-temperature indicating device according to claim 21, characterized in that the adhesive layer on the second backing is in direct contact with the adhesive layer on the first backing.

26. A time-temperature indicating device according to claim 21, characterized in that between the adhesive layers of the first and the second backing there is a diffusion film.

27. A time-temperature indicating device according to claim 1, characterized in that the component signaling soluble in the adhesive substance is iodine, and the indicator layer contains absorbent paper which includes starch and a wetting agent in which wetting agent the iodine is soluble.

28. A time-temperature indicating device according to claim 27, characterized in that the adhesive layer on the first backing is in immediate contact with the indicator layer.

29. A time-temperature indicating device according to claim 27, characterized in that between the indicator layer and the adhesive layer on the first backing there is a diffusion film.

30. A time-temperature indicating device according to claim 1, characterized in that the component soluble in the adhesive substance applied to the first backing is a coloring agent, and there is provided a second, transparent backing to which there is applied an adhesive layer containing a pressure-sensitive adhesive substance, which adhesive layer faces the adhesive layer on the first backing and is intransparent for the color of the coloring agent.

31. A time-temperature indicating device according to claim 30, characterized in that the adhesive layer applied to the second backing contains a delustring agent.

32. A time-temperature indicating device according to claim 31, characterized in that the delustring agent is titanium dioxide.

33. A time-temperature indicating device according to claim 30, characterized in that the adhesive layer on the second backing is positioned in direct contact with the adhesive layer on the first backing.

34. A time-temperature indicating device according to claim 30, characterized in that between the adhesive layers of the first and the second backing there is positioned a diffusion film.

* * * * *